US008330293B2

(12) United States Patent
Brown et al.

(10) Patent No.: US 8,330,293 B2
(45) Date of Patent: Dec. 11, 2012

(54) POWER FACTOR CORRECTION SYSTEM

(75) Inventors: David Brown, Ottawa (CA); Norman J. Weigert, Whitby (CA); Gery J. Kissel, Northville, MI (US); George D. Bellino, Hungtington Beach, CA (US); David B. Ouwerkerk, Torrance, CA (US); Christopher P. Lawrence, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 12/757,884

(22) Filed: Apr. 9, 2010

(65) Prior Publication Data
US 2011/0248567 A1 Oct. 13, 2011

(51) Int. Cl.
H02J 3/32 (2006.01)
H02J 7/34 (2006.01)

(52) U.S. Cl. ............ 307/48; 307/25; 320/137; 323/205; 323/207

(58) Field of Classification Search .................. None
See application file for complete search history.

(56) References Cited

U.S. PATENT DOCUMENTS

| | | | |
|---|---|---|---|
| 5,977,660 A | 11/1999 | Mandalakas et al. | |
| 7,075,193 B2 | 7/2006 | Yang et al. | |
| 7,205,749 B2 | 4/2007 | Hagen et al. | |
| 7,531,922 B1 | 5/2009 | Olson | |
| 7,940,029 B2 * | 5/2011 | Johnson | 323/207 |
| 2008/0077336 A1 * | 3/2008 | Fernandes | 702/57 |
| 2010/0001698 A1 * | 1/2010 | Johnson | 323/209 |
| 2011/0074215 A1 * | 3/2011 | Vartanian et al. | 307/46 |
| 2011/0204717 A1 * | 8/2011 | Shaffer | 307/18 |

* cited by examiner

Primary Examiner — Rexford Barnie
Assistant Examiner — Justen Fauth

(57) ABSTRACT

A charging system of the present invention is connectable to a power grid having a monitoring device. The monitoring device monitors the power delivered to a plurality of loads and determines a power factor and a power factor correction value associated with the loads. The power factor correction value indicates the difference between the power factor and unity. The charging system includes an electrical device, a charger in communication with the electrical device, a charging controller, a power factor correction circuit, a communication device, and a controller. The communication device of the charger receives a data signal from the monitoring device indicative of the power factor correction value associated with the plurality of loads. The power factor correction circuit is configured to communicate an input current to and from the power grid, which adjusts the power factor of the associated loads to about unity.

20 Claims, 4 Drawing Sheets

POWER FACTOR CORRECTION SYSTEM

FIELD

The present disclosure relates to a charging system connectable to a power grid, and more particularly to a charging system configured to deliver or draw an input current to or from the power grid to adjust a power factor.

BACKGROUND

The statements in this section merely provide background information related to the present disclosure and may or may not constitute prior art.

The power factor can be an important aspect to consider in an AC power distribution system. The power factor is a ratio of the real power to the apparent power, and is usually a value between 0 and 1. As the power factor approaches 1 the reactive or nonworking power approaches 0, which means that less energy in the power distribution system is being wasted. Having a low power factor that is significantly less than 1 may cause several issues. For example, more current is required to deliver the same amount of energy, and the power delivered to other loads in the power distribution system can be distorted due to the low power factor. Moreover, the power distribution system may need to be oversized to accommodate the reactive power generated due to the low power factor.

As a result, utility companies sometimes require that consumers maintain a power factor within a specified limit or be subject to a power-factor surcharge. A power-factor surcharge is a fee that the utility company charges if the average monthly power factor falls below a certain amount, which is usually about 0.95. Although power factor surcharges usually apply only to commercial consumers who consume large amounts of power, it is becoming more common to also charge residential consumers with the power-factor surcharge as well. Therefore, there is an increased need for consumer products that reduce energy costs and improve efficiency.

SUMMARY

A charging system connectable to a power grid having a monitoring device is provided. The monitoring device monitors the power delivered to a plurality of loads and determines a power factor and a power factor correction value associated with the loads. The power factor correction value indicates the difference between the power factor and unity. The charging system comprises an electrical device, a charger in communication with the electrical device, a charging controller, a power factor correction circuit, a communication device, and a controller.

The charger supplies power to the electrical device, where the charger supplies an output voltage to the electrical device. The charging controller is in communication with the charger and the electrical device, where the charging controller calculates a target output signal from the charger to the electrical device. The power factor correction circuit is selectively connectable to the power grid and is configured to communicate an input voltage and an input current to the charger from the power grid. The power factor correction circuit is configured to communicate the input current from the electrical device to the power grid. The communication device is configured to receive a data signal from the monitoring device, where the data signal is indicative of the power factor correction value associated with the plurality of loads monitored by the monitoring device. The controller is in communication with the power correction factor circuit, the communication device, the charging controller, and the charger.

The charger includes a first control logic for monitoring the input voltage, the input current, the output voltage, the target output signal, and the data signal indicative of the power factor correction value from the communication device. The charger further includes a second control logic for calculating a target input current that adjusts the power factor to unity, where the target input current is dependent on the input voltage and the power factor correction value. The charger includes a third control logic for calculating a controller command signal that is communicated to the power factor correction circuit, where the controller command signal is based on the target input current, the output voltage and the target output signal. The charger includes a fourth control logic for commanding the power factor correction circuit to change the input current to a value that causes the power factor to change to about unity.

In an embodiment of the present invention, the controller includes a fifth control logic for calculating an achieved power factor correction of the power grid that is based on the power factor and the power factor correction value. The achieved power factor correction is created by the power factor correction circuit changing the input current to the value that causes the power factor to change to about unity.

In another embodiment of the present invention, the achieved power factor correction indicates the duration and amount of input current that is communicated to and from the power grid.

In another embodiment of the present invention, the controller command signal is based on a charging mode of the charger.

In an embodiment of the present invention, the electrical signals indicating the power factor correction value are one of Broadband Over Power Line (BPL), Power Line Communications (PLC), Fixed Radio Frequency (RF) networks, wireless networks, and public networks.

In another embodiment of the present invention, the monitoring device is one of a smart meter and a utility AMI.

In yet another embodiment of the present invention, the communication device is configured to receive electrical signals from the monitoring device indicating a relative magnitude of a harmonic distortion current of the power grid.

In an embodiment of the present invention, the controller and the power factor correction circuit are integrated into a single module.

In another embodiment of the present invention, the electrical device is one of a rechargeable NiCd battery, a nickel metal hydride battery, and a lithium ion battery.

In an embodiment of the present invention, the target output signal is one of a target output voltage and a target output current.

In yet another embodiment of the present invention, the power grid is a residential utility system.

In an embodiment of the present invention, the monitoring device of the power grid is in communication with a second power grid including a second monitoring device, wherein the second electrical power system includes a second power factor.

In another embodiment of the present invention, the power correction factor circuit of the power grid adjusts the second power factor of the second power grid to be about unity.

In yet another embodiment of the present invention, a method of correcting a power factor in a power grid by a charging system is provided. The method includes the step connecting the power grid to the charging system. The method further includes the step of monitoring the power delivered to a plurality of loads by a monitoring device of the power grid, where the monitoring device determines a power factor and a power factor correction value associated with the loads. The power factor correction value indicates the difference between the power factor and unity. The method further comprises the step of transmitting a data signal from the monitoring device to a communication device of the charging system that is configured to receive the data signal. The data signal is indicative of the power factor correction value associated with the plurality of loads monitored by the monitoring device. The method also includes the step of delivering an input voltage and an input current to the charging system through a power factor correction circuit and to a charger. The power factor correction circuit is configured to communicate the input current to and from the power grid. The method further comprises the step of supplying power from the charger to a electrical device, where the charger supplies an output voltage to the electrical device. A charging controller that is in communication with the charger and the electrical device calculates a target output signal from the charger to the electrical device. The method further includes the step of monitoring the input voltage, the input current, the output voltage, the target output signal, and the data signal indicative of the power factor correction value from the communication device by a controller.

The method includes the step of calculating a target input current by the controller. The target input current adjusts the power factor to unity, where the target input current is dependent on the input voltage and the power factor correction value. The method further includes the step of calculating a controller command signal that is communicated from the controller to the power factor correction circuit, where the controller command signal is based on the target input current, the output voltage and the target output signal. The method also includes the step of controlling the power factor correction circuit to cause the power factor correction circuit to change the input current to a value that causes the power factor to change to about unity.

In an embodiment of the present invention, the method further comprises the step of calculating an achieved power factor correction of the power grid based on the power factor and the power factor correction value. The achieved power factor correction is created by the power factor correction circuit changing the input current to the value that causes the power factor to change to about unity.

In another embodiment of the present invention, the method further comprises the step of basing the controller command signal on a charging mode of the charger.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
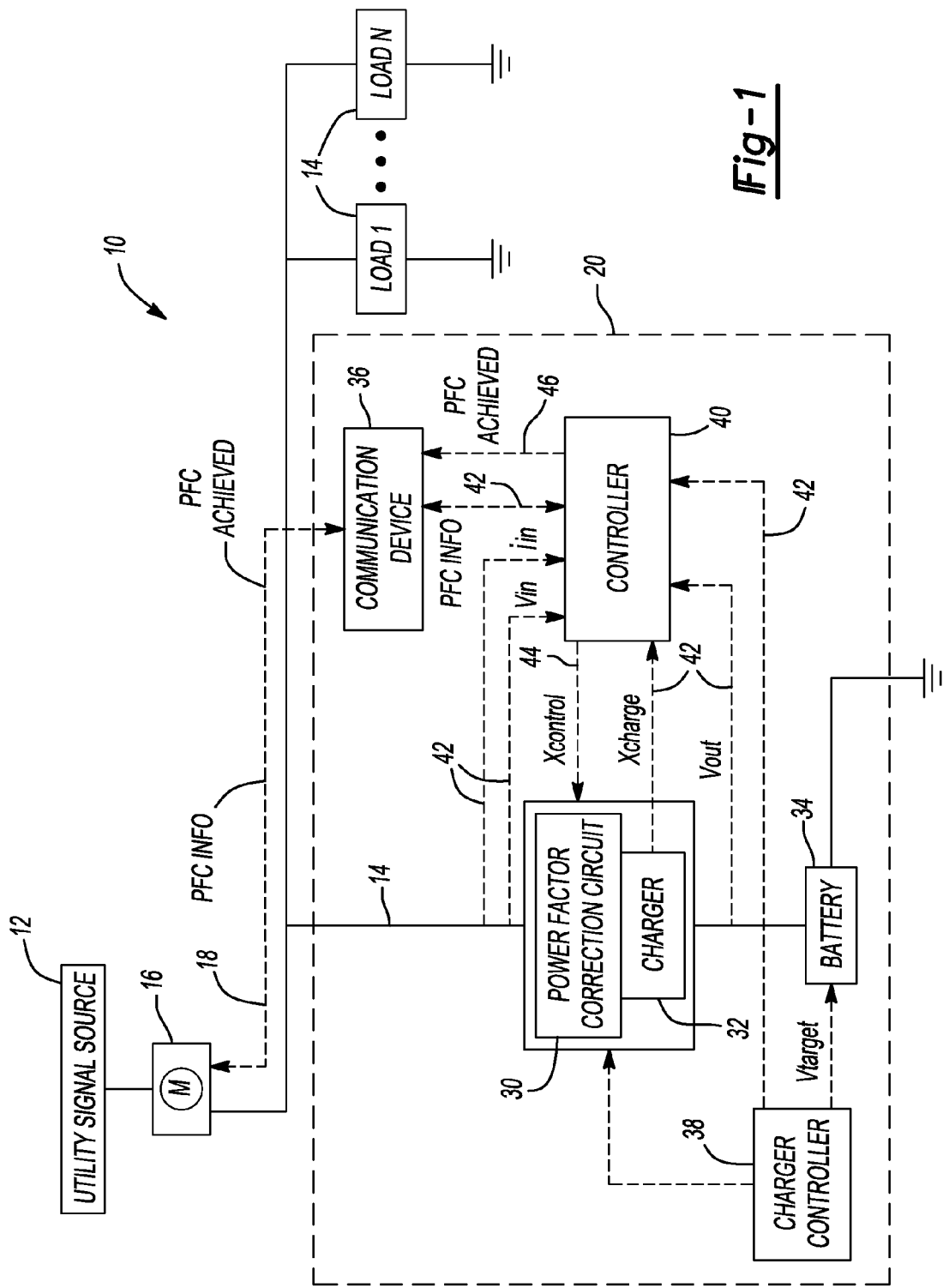
FIG. 1 is a diagram of a power grid connected to a vehicle charger, where the power grid is a single premise.

The following description is merely exemplary in nature and is not intended to limit the present disclosure, application, or uses. With reference to FIG. 1, a diagram of an electrical power grid is generally indicated by reference number 10. The power grid 10 includes a utility signal source 12 and at least two loads 14. In the embodiment as illustrated, the power grid 10 is a single building or premise, where a single power source distributes power throughout the building. Those of skill in the art will appreciate that the power grid 10 may be any type of electrical power system used to distribute electricity throughout the building, such as, for example, an electrical power system of an industrial or a residential building.

The utility signal source 12 receives electrical power from a distribution grid (not shown) of an electrical power system, and delivers electrical power to each of the loads 14. The loads 14 may represent any type of device that consumes electrical power including, but not limited to, an electrically powered clothes washer, a hair dryer, or an electrically powered stove. A power factor of the power grid 10 is created by the loads 14 drawing power from the power grid 10. The power factor is a ratio of the real power to the apparent power of the power grid 10, and is a value between 0 and 1. A load 14 with a low power factor draws more current than a load with a high power factor for the same amount of electrical power transferred. A higher current drawn by the load 14 having a low power factor increases the amount of energy lost in the power grid 10. Therefore, a high power factor (typically about 0.95 to about unity) is usually desired.

A monitoring device 16 is connected to the utility signal source 12 and is used to collect data regarding the amount of electrical power that the power grid 10 consumes. Some of the parameters the monitoring device 16 measures include, but are not limited to, the power factor, a power factor correction value, and a relative magnitude of a total harmonic distortion current of the power grid 10. The power factor correction value indicates the difference between the actual power factor created by the power grid 10 and unity. The total harmonic distortion current is the change in the waveform of the current in the power grid 10 from an ideal sinusoidal waveform. A high total harmonic distortion current can overheat the power grid 10, and potentially lead to failure of one of the loads 14. Thus, it is usually desirable to have the total harmonic distortion current be about 0.

The monitoring device 16 transmits the collected data as electrical data signals through a network 18. The network 18 may be any type of communication network for delivering and receiving data signals, such as, for example, Broadband Over Power Line (BPL), Power Line Communications (PLC), Fixed Radio Frequency (RF) networks, wireless networks, and public networks (such as landline, cellular, and paging). In one embodiment, the monitoring device 16 is a utility advanced metering infrastructure (AMI) device, where the AMI device measures, collects and analyzes energy usage from an electrical meter (not shown) of the power grid 10. Alternatively, in another example the monitoring device 16 is a smart meter that monitors electrical consumption in more detail than a conventional electrical meter. Although AMI devices and smart meters are discussed, one of skill in the art will appreciate that the monitoring device 16 may be any device that monitors the power factor, the power factor correction value, and the total harmonic distortion current of the power grid 10, and transmits the data signals indicative of same over the network 18.

One of the loads 14 is a charging system 20 connectable to the power grid 10. In one example, the charging system 20 is part of a plug-in electric vehicle including a rechargeable energy device. In the embodiment as illustrated, the electrical device is an energy storage device 34 such as, for example, a battery. The charging system 20 is selectively connectable to the power grid 10 by an electrical coupling (not shown), such as, for example, a conductive coupling. The vehicle charging system 20 includes a power factor correction circuit 30, a charger 32, the energy storage device 34, a communication device 36, a charging controller 38, and a controller 40.

The power factor correction circuit 30 is an electrical system that controls the amount of electrical current drawn by the charging system 20 to maintain the power factor of the power grid 10 to about unity. In the embodiment as shown, the charger 32 and the power factor correction circuit 30 are integrated together as a single module. However, one of skill in the art will appreciate that the power factor correction circuit 30 may be a separate module from the charger 32 as well. The power factor correction circuit 30 may include circuitry such as, but not limited to, a boost convertor, a buck convertor, or a buck-boost convertor. One commercially available example of a power factor correction circuit is the KVAR Power Factor 1200 manufactured by Save Energy LLC located in Hampton, N.J.

The power factor correction circuit 30 receives an input voltage $V_{IN}$ and an input current $i_{IN}$ from the power grid 10. The power factor of the power grid 10 is adjusted by the input current $i_{IN}$, where the power factor correction circuit 30 either delivers or draws the input current $i_{IN}$ to or from the power grid 10. The input current $i_{IN}$ is controlled by the power factor correction circuit 30 such that a sinusoidal waveform of the input current $i_{IN}$ is substantially in phase with a sinusoidal waveform of an input voltage $V_{IN}$, thereby causing the power factor to be about unity. The power factor correction circuit 30 delivers the input voltage $V_{IN}$ and the input current $i_{IN}$ from the power grid 10 to the charger 32.

The charger 32 is in communication with the energy storage device 34, such that the charger 32 supplies power to the energy storage device 34. Specifically, the charger 32 supplies an output voltage $V_{OUT}$ to charge the energy storage device 34. In one embodiment, energy storage device 34 is any type of rechargeable battery such as, but not limited to, a NiCd battery, a nickel metal hydride battery, or a lithium ion battery. The energy storage device 34 may also be a battery pack that is a set of multiple batteries or battery cells in a series or parallel configuration. The charger 32 includes different charging modes depending on the energy storage device's 34 charge level. For example, the charger 32 could be in rapid charging mode if the energy storage device 34 needs to be quickly charged, balancing mode if the energy storage device 34 is part of a multi-cell battery pack that needs to be equalized, or trickle charging if the energy storage device 34 needs to be charged at the self-discharging rate to maintain full capacity.

The charger 32 and the energy storage device 34 are in communication with the charging controller 38. The charging controller 38 is preferably an electronic control device having a preprogrammed digital computer or processor, control logic, memory used to store data, and at least one I/O peripheral. The control logic includes a plurality of logic routines for monitoring, manipulating, and generating data. The charging controller 38 monitors the charge level of the energy storage device 34 and the output voltage $V_{OUT}$. The charging controller 38 includes a control logic for calculating a target output signal from the charger 32 to the energy storage device 34. In one embodiment, the target output signal is a voltage signal, and is illustrated as a target output voltage $v_{TARGET}$. The target output voltage $v_{TARGET}$ is the amount of voltage from the charger 34 needed to maintain at the energy storage device 34 at about full capacity. Alternatively, in another embodiment, the target output signal is a target output current $i_{TARGET}$ that is calculated by the charger 32.

The communication device 36 is preferably a bidirectional electronic communication interface configured to send and receive data signals, and can be any type of electronic communication device such as, for example, a vehicle communication module (VCM). The communication device 36 sends and receives electrical data signals regarding the power grid 10 from the monitoring device 16 through the network 18. Specifically, the communication device 36 receives a data signal from the monitoring device 16 that is referred to as a power factor correction data $PFC_{INFO}$. The power factor correction data $PFC_{INFO}$ includes information indicative of the power factor, the power factor correction value and the relative magnitude of a harmonic distortion current of the power grid 10.

The controller 40 is preferably an electronic control device having a preprogrammed digital computer or processor, control logic, memory used to store data, and at least one I/O peripheral. The control logic includes a plurality of logic routines for monitoring, manipulating, and generating data. The controller 40 is in communication with and monitors data signals 42 from the power factor correction circuit 30, the charger 32, the communication device 36, and the charging controller 30. Specifically, the controller 40 includes control logic for monitoring the data signals 42 indicative of the input current $i_{IN}$ and the input voltage $V_{IN}$ across the charger 32, the target output signal calculated by the charging controller 38, a charge signal $X_{CHARGE}$ from the charger 32 indicating the present charging mode of the energy storage device 34, and the power factor correction data $PFC_{INFO}$ from the communication device 36.

Additionally, the controller 40 includes controller logic for calculating a target input current. The target input current is dependent on the input voltage $V_{IN}$ across the charger 32 and the power factor correction value that is included with the power factor correction data $PFC_{INFO}$ from the communication device 36. The target input current represents the current needed to adjust the power factor of the power grid 10 to be about unity by controlling the waveform of the input current $i_{IN}$ to be generally in phase with the waveform of the input voltage $V_{IN}$. The target input current also represents the current needed to adjust the input current $i_{IN}$ such that the total harmonic distortion current is about 0.

The controller 40 includes controller logic for calculating a controller command signal $x_{CONTROL}$ communicated to the power factor correction circuit 30. The controller command signal $x_{CONTROL}$ is a data signal 44 based on the target input current, the output voltage $V_{OUT}$, and the target output voltage $v_{TARGET}$. The controller command signal $x_{CONTROL}$ instructs the power factor correction circuit 30 to change the input current $i_{IN}$ to or from the power grid 10 to a value that causes the power factor of the power grid 10 to be about unity. Additionally, the input current $i_{IN}$ delivered or drawn from the power factor correction circuit 30 adjusts the total harmonic distortion of the input current $i_{IN}$ to be about 0. A power factor of about unity will generate almost no reactive or nonworking power, which reduces energy costs.

The controller 40 optionally includes control logic for calculating the achieved power factor correction $PFC_{ACHIEVED}$ of the power grid 10. The achieved power factor correction $PFC_{ACHIEVED}$ is calculated as the power factor correction circuit 30 either delivers or draws the input current $i_{IN}$ to or from the power grid 10. For example, the communication device 36 receives the power factor correction data $PFC_{INFO}$ from the monitoring device 16 through the network 18, and sends the power factor correction data $PFC_{INFO}$ to the controller 40. The controller 40 calculates the difference between the power factor of the power grid 10 to the power factor correction value. The difference between the power factor and the power factor correction value is the amount of achieved power factor correction $PFC_{ACHIEVED}$. The controller 40 sends a data signal 46 indicative of the achieved power factor correction $PFC_{ACHIEVED}$ to the communication device 36. The communication device 36 sends the achieved power factor correction value $PFC_{ACHIEVED}$ through the network 18 and to the monitoring device 16.

The achieved power factor correction $PFC_{ACHIEVED}$ indicates the duration and the amount of input current $i_{IN}$ that is either delivered or drawn by or from the power grid 10. This information can be communicated from the monitoring device 16 to a utility company, where the utility can compensate a consumer if there is more current delivered to the power grid 10 than drawn from the power grid 10. For example, the monitoring device 16 communicates the achieved power factor correction $PFC_{ACHIEVED}$ back to the utility company through a communication network such as, for example, a wireless network or a public network (such as landline, cellular, and paging).

Figure 2:
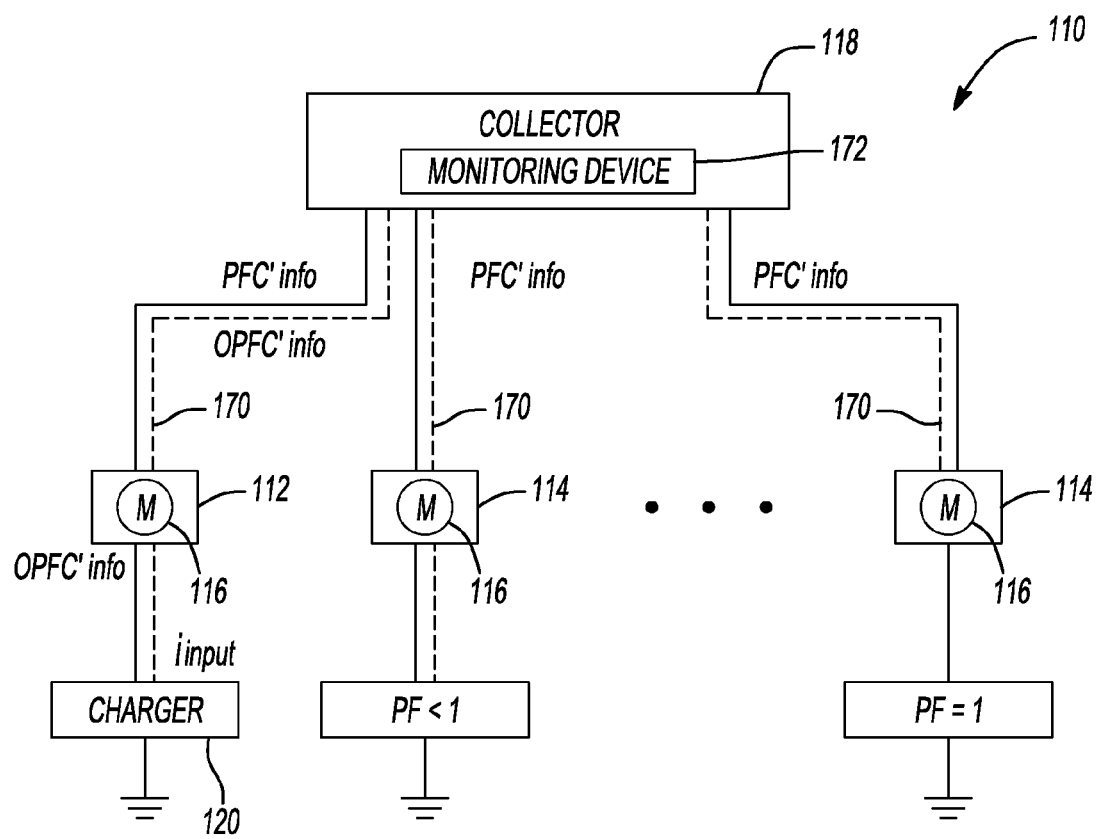
FIG. 2 is a diagram of an embodiment of a power grid connected to a vehicle charger, where the power grid includes a plurality of premises connected to a collector.
Figure 3:
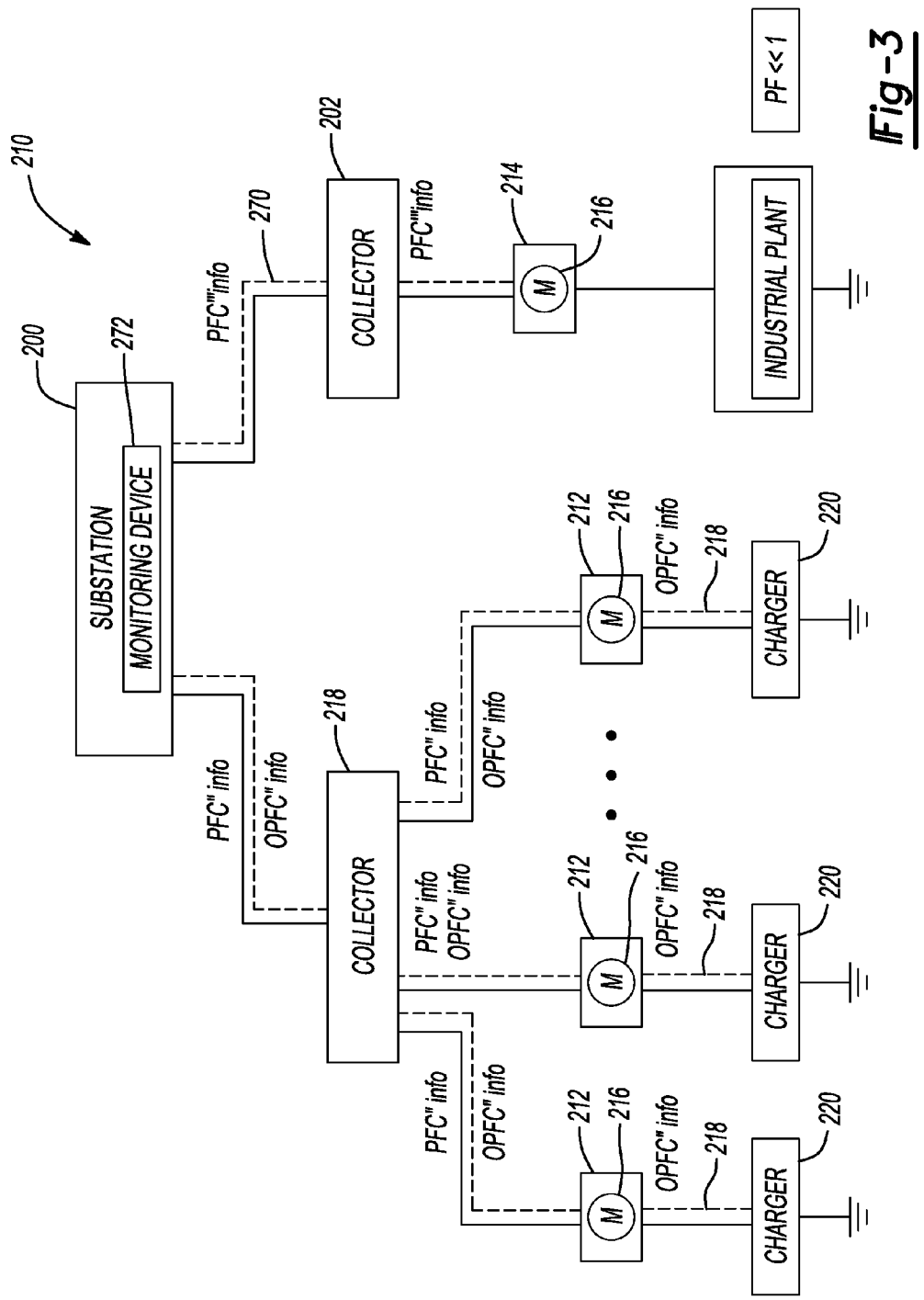
FIG. 3 is a diagram of an embodiment of a power grid connected to a plurality of vehicle chargers, where the power grid includes a plurality of collectors that are connected to an electrical substation.
Figure 4:
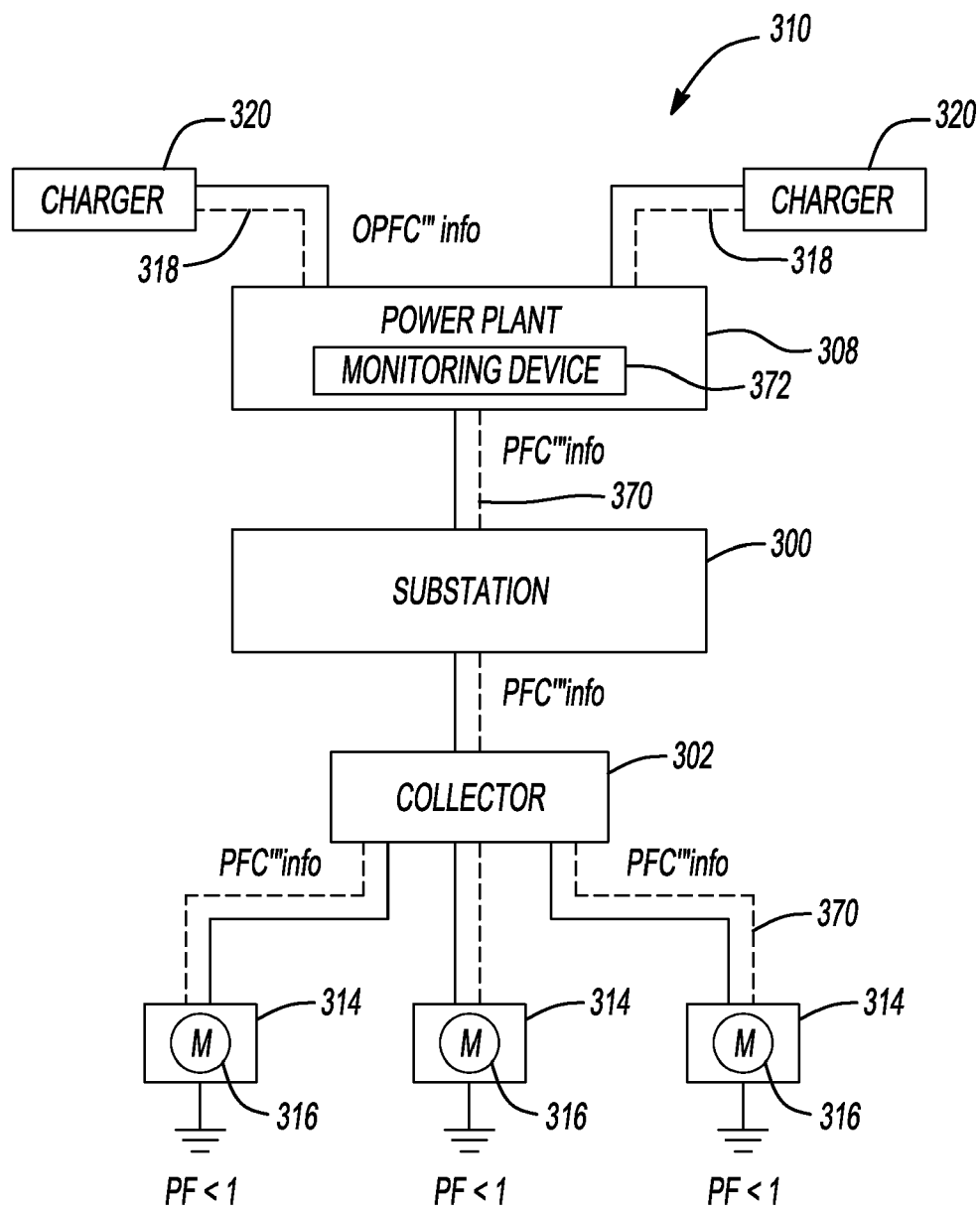
FIG. 4 is a diagram of an embodiment of a power grid where a power plant includes a plurality of chargers.

The charging system 20 illustrated in FIG. 1 is used to correct the power factor of a power grid 10, where the power grid 10 represents a single premise such as a residential or industrial building. The charging system 20 can also be used to bring the power factor of a neighboring premise to unity as well. For example, FIG. 2 is an illustration of a charging system 120 installed at a main premise 112, where the main premise may be a residential or an industrial building. The main premise 112 is connected to a plurality of other premises 114 by the power grid 110 through a collector 118. In the embodiment as shown, at least one premise 114 includes a power factor that is less than 1, where the charging system 20 is used to bring the power factor to about unity.

The main premise 112 and the premises 114 each include a monitoring device 116 that sends and receives electrical data signals, where the monitoring device 116 is a utility advanced metering infrastructure (AMI) device or a smart meter. The data signals indicate a power factor, a total power factor correction value, and a relative magnitude of a total harmonic distortion current created by the particular premise associated with the monitoring device 116, and is a power factor correction data $PFC'_{INFO}$. The power factor correction data $PFC'_{INFO}$ is sent to the collector 118 though a network 170.

The collector 118 gathers time-based data regarding the premises 112 and 114 associated with the power grid 110 though the network 170 by a collector monitoring device 172. The collector monitoring device 172 is preferably an electronic communication interface configured to send and receive data signals over the network 170. The collector monitoring device 172 includes a control logic for calculating an overall power factor of the power grid 110, an overall power factor correction value, and a relative magnitude of an overall total harmonic distortion current of the power grid 110 created by the main premise 112 and the premises 114. One example of a commercially available collector 118 that can be used is the ALPHA Plus meter manufactured by Elster Solutions in Raleigh, N.C.

The collector monitoring device 172 transmits data signals indicating the overall power factor of the power grid 110, the overall power factor correction value, and the overall total harmonic distortion current of the power grid 110 over the network 170 to the monitoring device 116 of the main premise 112 as the overall power factor correction data $OPFC'_{INFO}$. The monitoring device 116 of the main premise 112 then communicates the overall power factor correction data $OPFC'_{INFO}$ to the charging system 120 though a network 118. The power factor correction circuit 30 (FIG. 1) of the charging system 120 either delivers or draws the input current $i_{IN}$ to or from the collector 118 to adjust the overall power factor of the power grid 110 to be about unity. The collector 118 then adjusts the power factor of each premise 114 to have a power factor that is about unity.

In yet another embodiment, a power grid 210 may include multiple premises 212 that each include a vehicle charger 220. A collector 218 is connected with each of the premises 212 as well as an electrical substation 200. The electrical substation 200 is connected to another collector 202 that is connected to a separate premise 214 that has a power factor that is less than unity. In the embodiment as shown, the separate premise 214 is an industrial plant that is a consumer of significantly larger amounts of power when compared to each of the premises 212.

The premises 212 and the separate premise 214 each include a monitoring device 216 that sends and receives electrical data signals, where the monitoring device is a utility advanced metering infrastructure (AMI) device or a smart meter. The data signals indicate a power factor, a total power factor correction value, and a relative magnitude of a total harmonic distortion current created by the particular premise associated with the monitoring device 216, and is a power factor correction data $PFC''_{INFO}$. The power factor correction data $PFC''_{INFO}$ is sent to the respective collectors 202 and 218 though a network 270. The collectors 202 and 218 each gather the power factor correction data $PFC''_{INFO}$ from the respective premises 214 and 222, and send the associated data though the network 270 to the electrical substation 200.

The electrical substation 200 includes a substation monitoring device 272 that is preferably an electronic communication interface configured to send and receive data signals over the network 270. The substation monitoring device 272 includes a control logic for calculating an overall power factor of the power grid 210, an overall power factor correction value, and a relative magnitude of an overall total harmonic distortion current of the power grid 210.

The substation monitoring device 272 transmits data signals indicating the overall power factor of the power grid 210, the overall power factor correction value, and the overall total harmonic distortion current over the network 270 and to the monitoring devices 216 of the premises 212 as the overall power factor correction data $OPFC''_{INFO}$. The monitoring device 216 of the premises 212 communicates the overall power factor correction data $OPFC''_{INFO}$ to the respective charging system 220 though a network 218. The power factor correction circuit 30 (FIG. 1) of each charging system 220 either delivers or draws the input current $i_{IN}$ to or from the collector 218 to adjust the overall power factor of the power grid 210 to be about unity.

The charging systems 220 each adjust the overall power factor of the power grid 210 at the substation 200. The substation 200 then adjusts the power factor of the separate premise 214 though the collector 202 such that the power factor of the separate premise 214 is about unity.

In another embodiment, a power grid 310 may include a power plant 308 that includes several chargers 320. In this particular embodiment, the charging system 320 is not part of a plug-in electric vehicle, but is rather a stand-alone charging device. Moreover, the charging system 320 is utilized at the power plant 308 rather than one or more separate premises. The charging system 320 is used to bring the power factor of the power grid 310 to about unity. An electrical substation 300 is connected to the power plant 308 as well as at least one collector 302. The collector 302 is connected to several separate premises 314 that each have a power factor that is less than unity.

The premises 314 each include a monitoring device 316 that sends and receives electrical data signals, where the monitoring device is a utility advanced metering infrastructure (AMI) device or a smart meter. The data signals indicate a power factor, a total power factor correction value, and a relative magnitude of a total harmonic distortion current created by the particular premise associated with the monitoring device 316, and is a power factor correction data $PFC'''_{INFO}$. The power factor correction data $PFC'''_{INFO}$ is sent to the collector 302 though a network 370. The collector 302 gathers the power factor correction data $PFC'''_{INFO}$ from the premises 314, and sends the associated data though the network 370 to the electrical substation 300, and to the power plant 308.

The power plant 308 includes a monitoring device 372 that is preferably an electronic communication interface configured to send and receive data signals over the network 370. The monitoring device 372 includes a control logic for calculating an overall power factor of the power grid 310, an overall power factor correction value, and a relative magnitude of an overall total harmonic distortion current of the power grid 310.

The collector monitoring device 372 transmits data signals indicating the overall power factor of the power grid 310, the overall power factor correction value, and the overall total harmonic distortion current of the power grid 310 as the overall power factor correction data $OPFC'''_{INFO}$. The overall power factor correction data $OPFC'''_{INFO}$ is then communicated to each of the charging systems 320 though a network 318. The power factor correction circuit 30 (FIG. 1) of each charging system 320 either delivers or draws the input current $i_{IN}$ to or from the power plant 308 to adjust the overall power factor of the power grid 310 to be about unity. The charging systems 320 are used to adjust the overall power factor of the power grid 310 at the power plant 308. The power plant 308 adjusts the power factor through the substation 300, where the substation adjusts the power factor of the premises 314 though the collector 302 such that the power factor of the premises 314 are about unity.

The description of the invention is merely exemplary in nature and variations that do not depart from the gist of the invention are intended to be within the scope of the invention. Such variations are not to be regarded as a departure from the spirit and scope of the invention.

What is claimed is:

1. A charging system connectable to a power grid having a monitoring device, wherein the monitoring device monitors the power delivered to a plurality of loads and determines a power factor and a power factor correction value associated with the loads, wherein the power factor correction value indicates the difference between the power factor and unity, comprising:
   an electrical device;
   a charger in communication with the electrical device for supplying power to the electrical device, the charger supplying an output voltage to the electrical device;
   a charging controller in communication with the charger and the electrical device, wherein the charging controller calculates a target output signal for charging the electrical device;
   a power factor correction circuit selectively connectable to the power grid and configured to communicate an input voltage and an input current to the charger from the power grid, and wherein the power factor correction circuit is configured to communicate the input current from the electrical device to the power grid;
   a communication device configured to receive a data signal from the monitoring device wherein the data signal is indicative of the power factor correction value associated with the plurality of loads monitored by the monitoring device; and
   a controller in communication with the power correction factor circuit, the communication device, the charging controller, and the charger, wherein the controller includes:
      a first control logic for monitoring the input voltage, the input current, the output voltage, the target output signal, and the data signal indicative of the power factor correction value from the communication device;
      a second control logic for calculating a target input current that adjusts the power factor to unity, wherein the target input current is dependent on the input voltage and the power factor correction value;
      a third control logic for calculating a controller command signal that is communicated to the power factor correction circuit, wherein the controller command signal is based on the target input current, the output voltage and the target output signal; and
      a fourth control logic for commanding the power factor correction circuit to change the input current to a value that causes the power factor to change to about unity.

2. The charging system of claim 1 wherein the controller includes a fifth control logic for calculating an achieved power factor correction of the power grid that is based on the power factor and the power factor correction value, wherein the achieved power factor correction is created by the power factor correction circuit changing the input current to the value that causes the power factor to change to about unity.

3. The charging system of claim 2 wherein the achieved power factor correction indicates the duration and amount of input current communicated to and from the power grid.

4. The charging system of claim 1 wherein the controller command signal is based on a charging mode of the charger.

5. The charging system of claim 4 wherein the charging mode is one of trickle charging, rapid charging, and balancing.

6. The charging system of claim 1 wherein the electrical signals indicating the power factor correction value are one of Broadband Over Power Line (BPL), Power Line Communications (PLC), Fixed Radio Frequency (RF) networks, wireless networks, and public networks.

7. The charging system of claim 1 wherein the monitoring device is one of a smart meter and a utility AMI.

8. The charging system of claim 1 wherein the communication device is configured to receive electrical signals from the monitoring device indicating a relative magnitude of a harmonic distortion current of the power grid.

9. The charging system of claim 1 wherein the controller and the power factor correction circuit are integrated into a single module.

10. The charging system of claim 1 wherein the electrical device is one of a rechargeable NiCd battery, a nickel metal hydride battery, and a lithium ion battery.

11. The charging system of claim 1 wherein the target output signal is one of a target output voltage and a target output current.

12. An electrical system, comprising:
a power grid having a monitoring device and a plurality of loads, wherein the monitoring device monitors the power delivered to the plurality of loads and determines a power factor and a power factor correction value associated with the loads, wherein the power factor correction value indicates the difference between the power factor and unity; and
a charging system connectable to the power grid, comprising:
an electrical device;
a charger in communication with the electrical device for supplying power to the electrical device, the charger supplying an output voltage to the electrical device;
a charging controller in communication with the charger and the electrical device, wherein the charging controller calculates a target output signal for charging the electrical device;
a power factor correction circuit selectively connectable to the power grid and configured to communicate an input voltage and an input current to the charger from the power grid, and wherein the power factor correction circuit is configured to communicate the input current from the electrical device to the power grid;
a communication device configured to receive a data signal from the monitoring device wherein the data signal is indicative of the power factor correction value associated with the plurality of loads monitored by the monitoring device; and
a controller in communication with the power correction factor circuit, the communication device, the charging controller, and the charger, wherein the controller includes:
a first control logic for monitoring the input voltage, the input current, the output voltage, the target output signal, and the data signal indicative of the power factor correction value from the communication device;
a second control logic for calculating a target input current that adjusts the power factor to unity, wherein the target input current is dependent on the input voltage and the power factor correction value;
a third control logic for calculating a controller command signal that is communicated to the power factor correction circuit, wherein the controller command signal is based on the target input current, the output voltage, a charging mode of the charger, and the target output signal; and
a fourth control logic for commanding the power factor correction circuit to change the power factor correction circuit to a value that causes the power factor to change to about unity.

13. The electrical system of claim 12 wherein the controller includes a fifth control logic for calculating an achieved power factor correction of the power grid that is based on the power factor and the power factor correction value, wherein the achieved power factor correction changing the input current to the value that causes the power factor to change to about unity.

14. The electrical system of claim 12 wherein the monitoring device is one of a smart meter and a utility AMI.

15. The electrical system of claim 12 wherein the power grid is a residential utility system.

16. The electrical system of claim 12 wherein the monitoring device of the power grid is in communication with a second power grid including a second monitoring device, wherein the second electrical power system includes a second power factor.

17. The electrical system of claim 16 wherein the power correction factor circuit of the power grid changes the second power factor of the second power grid to be about unity.

18. A method of correcting a power factor in a power grid by a charging system, comprising the steps of:
connecting the power grid to the charging system;
monitoring the power delivered to a plurality of loads by a monitoring device of the power grid, wherein the monitoring device determines a power factor and a power factor correction value associated with the loads, and wherein the power factor correction value indicates the difference between the power factor and unity;
transmitting a data signal from the monitoring device to a communication device of the charging system that is configured to receive the data signal, wherein the data signal is indicative of the power factor correction value associated with the plurality of loads monitored by the monitoring device;
delivering an input voltage and an input current to the charging system through a power factor correction circuit and to a charger, wherein the power factor correction circuit is configured to communicate the input current to and from the power grid;
supplying power from the charger to an electrical device, wherein the charger supplies an output voltage to the electrical device, wherein a charging controller that is in communication with the charger and the electrical device calculates a target output signal for charging the electrical device;
monitoring the input voltage, the input current, the output voltage, the target output signal, and the data signal indicative of the power factor correction value from the communication device by a controller;
calculating a target input current by the controller, wherein the target input current adjusts the power factor to unity, and where the target input current is dependent on the input voltage and the power factor correction value;
calculating a controller command signal that is communicated from the controller to the power factor correction circuit, wherein the controller command signal is based on the target input current, the output voltage and the target output signal; and
commanding the power factor correction circuit to cause the power factor correction circuit to change the input current to a value that causes the power factor to change to about unity.

19. The method of claim 17 further comprising the step of calculating an achieved power factor correction of the power grid based on the power factor and the power factor correction value, wherein the achieved power factor correction is created by the power factor correction circuit changing the input current to the value that causes the power factor to change to about unity.

20. The method of claim 17 further comprising the step of basing the controller command signal on a charging mode of the charger.

* * * * *